Jan. 9, 1923.
G. Q. LEWIS.
FRICTION SHOCK ABSORBING MECHANISM.
FILED JUNE 13, 1921.
1,441,288.
2 SHEETS—SHEET 1.
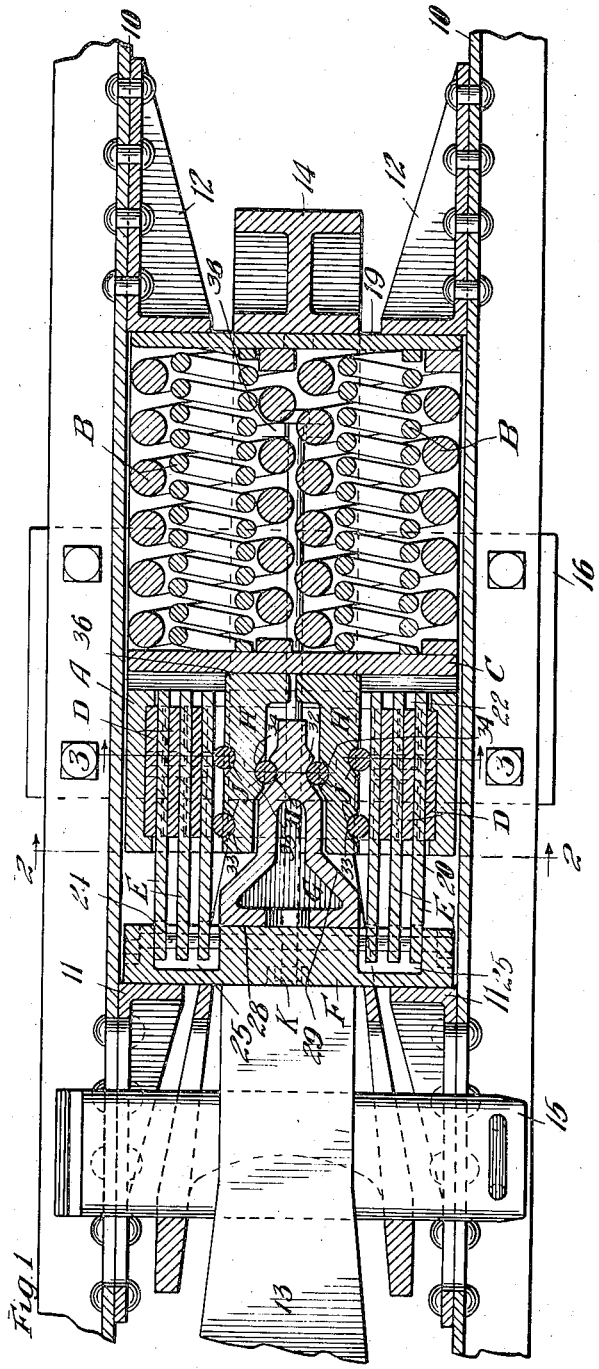
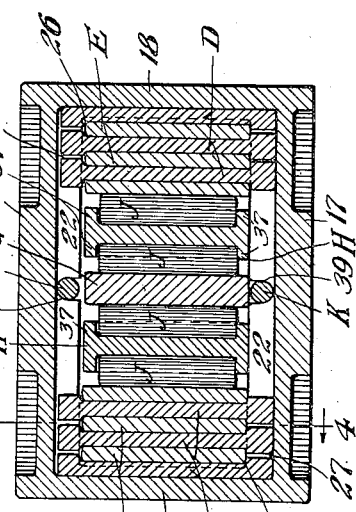
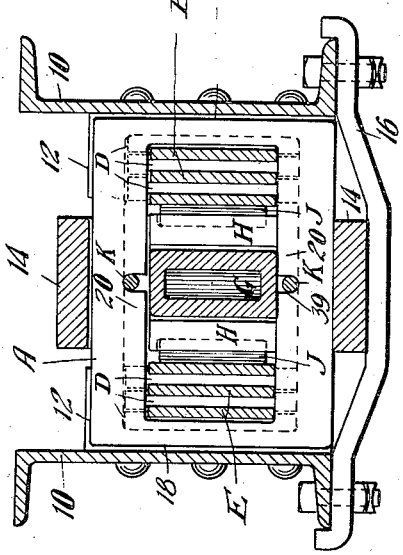
Witnesses
Wm Geiger
Inventor
Goodrich Q. Lewis
By Geo. I. Haight
His Atty.

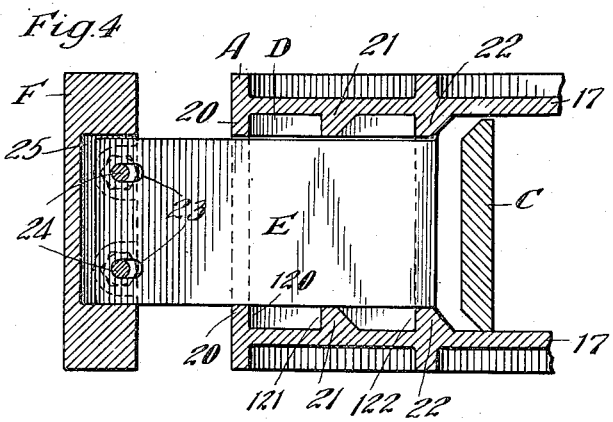
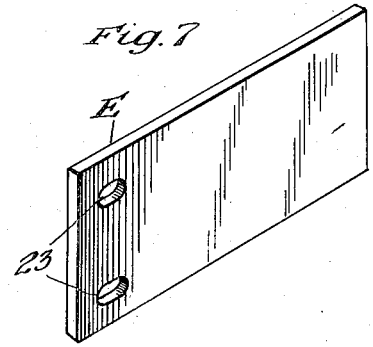
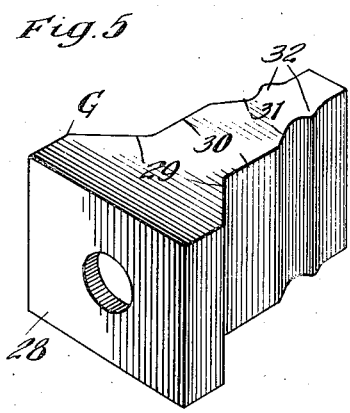
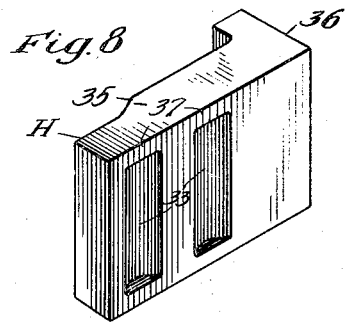
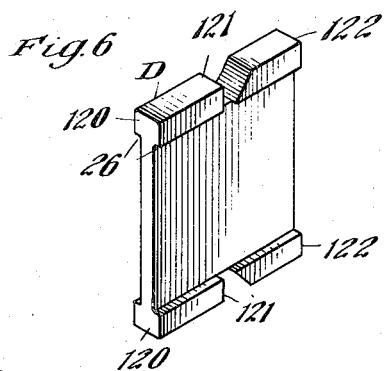

Patented Jan. 9, 1923.

1,441,288

UNITED STATES PATENT OFFICE.

GOODRICH Q. LEWIS, OF WHEATON, ILLINOIS, ASSIGNOR TO WILLIAM H. MINER, OF CHAZY, NEW YORK.

FRICTION SHOCK-ABSORBING MECHANISM.

Application filed June 13, 1921. Serial No. 477,037.

*To all whom it may concern:*

Be it known that I, GOODRICH Q. LEWIS, a citizen of the United States, residing at Wheaton, in the county of Du Page and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft riggings and wherein is obtained high capacity, certain release, long life and a graduated smooth action during compression strokes combined with certain release.

Another object of the invention is to provide a mechanism of the character above indicated wherein are employed a series of intercalated friction plates in combination with a wedging system anti-frictionally mounted with respect to the friction members and with the elements of the system anti-frictionally mounted with respect to each other.

A still further object of the invention is to provide a friction mechanism of the character indicated wherein is obtained a constant area of friction surface regardless of the degree of compression.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Figure 1. Fig. 3 is an enlarged vertical transverse sectional view of the shock absorbing mechanism proper corresponding substantially to the line 3—3 of Figure 1. Fig. 4 is a broken vertical longitudinal sectional view corresponding substantially to the line 4—4 of Figure 3. Figs. 5, 6, 7 and 8 are detail perspectives of the central wedging element, one of the stationary friction plates, one of the movable friction plates, and one of the side wedge elements, respectively.

In said drawings, 10—10 denote channel draft sills of a railway car, to the inner faces of which are secured front stop lugs 11 and rear stop lugs 12. A portion of the drawbar is indicated at 13, the same being operatively associated with the shock absorbing mechanism proper by a hooded cast yoke 14 and a coupler key 15. The yoke and mechanism therewithin are supported by a detachable saddle plate 16.

The improved shock absorbing mechanism proper, as shown, comprises, broadly, a casting A; twin springs B—B; a spring follower C; a series of relatively stationary friction plates D—D; a series of relatively movable friction plates E—E; a front follower F; a central pressure-transmitting wedge G; side wedge elements H—H; anti-friction rollers J—J; and retainer bolts K—K.

The casting A, which may be variously termed a follower-acting member, column-load-sustaining member, or combined friction shell and spring cage, is shown as having upper and lower walls 17—17, side walls 18—18 and a rear vertical connecting wall 19, the latter functioning as the rear follower of the draft rigging. The top and bottom walls 17 extend the full length of the casting A, whereas the side walls 18 are relatively short so as to leave the major portion of the sides of the casting open to thereby permit of the insertion and removal of the spring follower and spring. It will be noted that the construction is such as to provide what may be termed a hollow box-like shell or casing of rectangular form at the forward end thereof.

On the interior of said shell or casing, the upper and lower walls are provided with inturned transverse flanges or ribs 20, 21 and 22 arranged in three series—one behind the other. The ribs 20 obviously provide rearwardly-facing shoulders and the other ribs 21 and 22 provide forwardly-facing shoulders. Said shoulders are provided to cooperate with corresponding shoulders 120, 121 and 122, respectively, on the stationary friction plates D. In this manner the plates D are anchored against longitudinal movement with respect to the casting A but are freely responsive to laterally-applied pressure.

The movable friction plates E are of plane rectangular form preferably cut in suitable lengths from a strip, and each of said plates is provided near its outer end with a pair of elongated slots or openings 23—23, through which are passed transversely-extending bolts 24—24 carried by the front follower F. The latter is suitably cut away on each side of the center to form rectangular recesses 25—25, in which the front ends of the plates E are accommodated. The plates E are intercalated and preferably alternated with respect to the stationary plates D, as shown in Fig. 1—the two series being divided into two groups, one on each side of the center line of the mechanism, thus leaving a central space in which is accommodated the wedging system. As clearly shown in Figs. 1 and 4, the inner ends of the movable plates E terminate at a slight distance from the follower C, so that the latter never comes in contact with the plates E either in compression or release. Each of the plates D is of generally I-cross section, as shown in Figs. 3 and 6, so as to thereby provide guides or channels 26—26 on each side thereof for the movable plates E. In actual practice, the thickness of the plates E and the depth of the channel guides 26 will be so proportioned as to insure leaving a slight space 27—27 between the thickened upper and lower edges of the plates D, as shown in Fig. 3, to thereby allow for wear on the parts and always leave the plates responsive to lateral or transverse pressure.

The central wedge member G has an outer flat bearing face 28 which bears directly against the inner face of the follower F. The member G is tapered inwardly for a distance, as indicated by the sloping faces 29—29, thence the sides extend parallel, as indicated at 30—30, and then converge inwardly, as indicated at 31—31, to provide the wedge roller seats. At the inner ends of the wedge roller seats 31, limiting shoulders 32—32 are formed for the central pair of anti-friction rollers J.

The wedge elements H—H are of like construction but oppositely disposed, each of said elements having an outer flat face in which are formed two elongated recesses so designed as to produce roller seats 33—33 for the respective outer pairs of anti-friction rollers J. On its inner side, each element H is formed with a wedge roller seat 34 opposite and parallel to the corresponding wedge roller seat 31. At the forward or outer end of the roller seat 34 is formed a limiting shoulder 35 for the anti-friction roller, as clearly illustrated in Fig. 1. The inner ends of the wedge elements H extend transversely of the mechanism, as indicated at 36, so as to adapt them to bear directly upon the spring follower C. The wedge elements H are formed with overhanging flanges, as indicated at 37—37, at the opposite ends of all of the wedge roller seats thereon, so as to prevent endwise movement of the anti-friction rollers, as will be clear from an inspection of Fig. 3.

The retainer bolts K are preferably two in number and each is anchored at its forward end in the follower F and at its rear end behind suitably notched flanges 38 cast integrally with the casting A. The bolts K straddle the wedge elements and the ribs 20, 21 and 22 are suitably cut away at the center, as indicated at 39 in Fig. 3, to accommodate said bolts K.

The springs B are preferably two in number, in horizontal twin arrangement, and the spring follower C is of ordinary form providing a bearing for the front ends of both of the springs B.

The operation is as follows, assuming an inward or buffing movement of the drawbar. As the drawbar moves inwardly, the follower F is forced simultaneously and uniformly therewith. Owing to the normal clearance between the outer ends of the plates E and the follower F and the elongated slots 23, there will not be any movement of the plates E during the initial— preferably a half inch—movement of the follower F. As the follower F starts its inward movement, however, the wedging action is immediately set up due to the yielding resistance afforded by the springs B reacting through the follower C and wedge elements H. On account of the anti-frictional mounting between the wedge elements H and the innermost plates E, and the anti-friction rollers between the central wedge element G and the wedge elements H, the wedging action will be extremely sensitive and the desired lateral or transverse pressure on the plates set up instantaneously. In this connection, it will be observed that the degree of lateral pressure created on the plates is dependent upon the spring resistance B and is not proportional to the blow struck. For this reason, the pressure exerted on the frictional elements can be held down to any desired reasonable amount without danger of excessive crushing forces or danger of indenting or deforming the rollers or other parts. After the follower F with the wedging system has moved inwardly the approximate half inch independently of the plates E, the latter will be engaged and thereafter actuated in unison with the follower F. It will be noted that the desired pressure has previously been created on the intercalated friction elements before the plates E begin their longitudinal movement. The compression movement of the parts continues until the follower F is limited in its approach toward the casting A by engaging with the latter. During release, after removal of the actuating force, the springs B immediately react and force the follower C, wedge elements H, wedge member G and follower F outwardly, the release being extremely sensitive on account of the anti-friction rollers above described. The outward movement of the wedge system and follower F is, initially, wholly independent of any movement of the plates E, for the reason that the bolts 24 that are carried by the follower F are free to move the limited distance afforded by the elongated slots 23 in the plates E. Sufficient movement of the wedging system and follower F, independent of the friction plates, is allowed to insure reduction of the wedging or spreading action substantially to the minimum. After the latter result has occurred, the springs B continue to force the wedging system and follower F outwardly and the latter in turn pulls the plates E outwardly from the outer ends of the latter, and ultimately all of the parts are restored to normal position ready for a succeeding blow.

On account of the large area of friction surfaces provided, the pressure per unit of frictional area may be kept at a low figure, with the result that the life of the parts is prolonged. All of the wearing parts—that is, the stationary and movable plates may always be manufactured at comparatively small expense and are readily replaceable, so that the cost of maintenance is reduced to a minimum. By varying the wedging angles and capacity of the springs, any desired frictional capacity may be obtained and the action maintained uniform—that is, corresponding increments in applied forces will result in corresponding increments in the movements of the mechanism. Another important feature of the invention resides in the fact that the ordinary slight shocks, due principally to surging, will be absorbed substantially entirely by the springs B without any actuation of the plates E, since the wedging system and follower F are free to move the approximate half inch without actuation of any of the plates, and this also serves to increase the life of the mechanism, since it is a well-known fact that for every blow requiring the full capacity of a draft gear, there are probably seventy-five to a hundred much smaller blows that only require a comparatively small percentage of the total capacity of the mechanism.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a load-sustaining member; of a series of relatively stationary friction elements carried by said member; a series of relatively movable friction elements intercalated with said stationary elements, all of said elements being responsive to laterally-applied pressure; a spring resistance; an outer follower movable relatively toward and from said member; a lateral-pressure-creating system interposed between said follower and spring resistance and co-operable with said intercalated friction elements; and means, stationary with respect to said follower but movable a limited distance with respect to said movable friction elements, adapted to pull the latter during a release movement of the mechanism.

2. In a friction shock absorbing mechanism, the combination with a load-sustaining member; of a series of relatively stationary friction elements carried by said member; a series of relatively movable friction elements intercalated with said stationary elements, all of said elements being responsive to laterally-applied pressure; a spring resistance; an outer follower movable relatively toward and from said member; a lateral-pressure-creating system interposed between said follower and spring resistance and co-operable with said intercalated friction elements; and means, stationary with respect to said follower but movable a limited distance with respect to said movable friction elements, adapted to pull the latter during a release movement of the mechanism, said means comprising bolts carried by the follower and extending through elongated slots in said elements.

3. In a friction shock absorbing mechanism, the combination with a load-sustaining member; of a series of relatively stationary friction plates carried by said member; a series of relatively movable friction plates intercalated with said stationary plates, all of said plates being responsive to laterally-applied pressure; a spring resistance; an outer follower movable relatively toward and from said member a lateral-pressure-creating system interposed between said follower and spring resistance and co-operable with said intercalated friction plates; and means, stationary with respect to said follower but movable a limited distance with respect to said movable friction plates, adapted to pull the latter during a release movement of the mechanism.

4. In a friction shock absorbing mechanism, the combination with a load-sustaining member; of a series of relatively stationary friction plates carried by said member; a series of relatively movable friction plates intercalated with said stationary plates, all of said plates being responsive to laterally-applied pressure; a spring resistance; an outer follower movable relatively toward and from said member; a lateral-pressure-creating system interposed between said follower and spring resistance and co-operable with said intercalated friction plates; and means, stationary with respect to said follower but movable a limited distance with respect to said movable friction plates, adapted to pull the latter during a release movement of the mechanism, said means comprising bolts carried by the follower and extending thru elongated slots in said plates.

5. In a friction shock absorbing mechanism, the combination with a hollow load-sustaining member; of a series of relatively stationary friction elements mounted within said member; a series of relatively movable friction elements intercalated with said stationary friction elements, all of said elements being responsive to laterally-applied pressure and the elements being divided into two laterally-separated groups; a spring resistance; an outer follower movable relatively toward and from said member; a lateral-pressure-creating system located between said groups of friction elements and interposed between said follower and spring resistance and adapted to exert lateral pressure on the groups of elements; and means, stationary with respect to said follower but movable a limited distance with respect to said movable friction elements, adapted to pull the latter during a release movement of the mechanism.

6. In a friction shock absorbing mechanism, the combination with a hollow load-sustaining member; of a series of relatively stationary friction elements mounted within said member; a series of relatively movable friction elements intercalated with said stationary friction elements, all of said elements being responsive to laterally-applied pressure and the elements being divided into two laterally separated groups; a spring resistance; an outer follower movable relatively toward and from said member; a lateral-pressure-creating system located between said groups of friction elements and interposed between said follower and spring resistance and adapted to exert lateral pressure on the groups of elements; and means, stationary with respect to said follower but movable a limited distance with respect to said movable friction elements, adapted to pull the latter during a release movement of the mechanism, said means comprising a plurality of bolts rigidly mounted in said follower and extending through elongated slots in said elements.

7. In a friction shock absorbing mechanism, the combination with a hollow load-sustaining member; of two groups of intercalated relatively stationary and relatively movable friction plates carried within said member; a spring resistance; an outer follower movable relatively toward said member; a lost motion connection between said follower and said movable friction plates, including a part fixed to said follower, adapted to pull said movable plates during a release movement of the mechanism; and a wedging system co-operable with said group of friction plates and located therebetween, said system comprising a central wedge member, two side wedge elements, anti-friction means between said central member and side elements, and anti-friction means between said side elements and the respective groups of plates.

8. In a friction shock absorbing mechanism, the combination with a hollow load-sustaining member; of two groups of intercalated relatively stationary and relatively movable friction plates carried within said member; a spring resistance; a wedging system co-operable with said group of friction plates and located therebetween, said wedging system comprising a central two-face wedge member, two side wedge elements, anti-friction rollers between said central member and side elements, and a plurality of anti-friction rollers between each side wedge element and corresponding group of friction plates; and an outer main follower having a lost motion connection with said movable friction plates and adapted to actuate the latter during a compression stroke, said follower and the wedging system having a limited amount of movement longitudinally of the mechanism independent of the movable friction plates.

9. In a friction shock absorbing mechanism, the combination with a casting having a hollow casing at one end thereof and an integrally formed spring cage; of a spring resistance within said cage; a plurality of relatively stationary friction plates within said casing anchored against longitudinal movement but responsive to laterally-applied pressure; a plurality of movable friction plates alternated with said stationary friction plates, the movable friction plates normally extending outwardly of the casing, the movable and stationary friction plates being divided into two laterally-separated groups; a spring follower interposed between said spring resistance and the inner ends of the plates; an outer main follower; a wedging system interposed between said main follower and spring follower and located between the groups of plates, said system including wedging elements anti-frictionally mounted with respect to each other and with respect to the groups of plates; and means rigid with respect to said main follower adapted to engage and pull said movable friction plates outwardly from the casing during a release movement, said main follower and means carried thereby having a limited amount of movement independently of the movable parts during compression and release.

In witness that I claim the foregoing I have hereunto subscribed my name this 2nd day of June, 1921.

GOODRICH Q. LEWIS.

Witnesses:
    CARRIE GAILING,
    ANN BAKER.